Oct. 11, 1938.  L. A. PHILIPP  2,133,039
AIR CONDITIONING SYSTEM
Filed Sept. 1, 1934
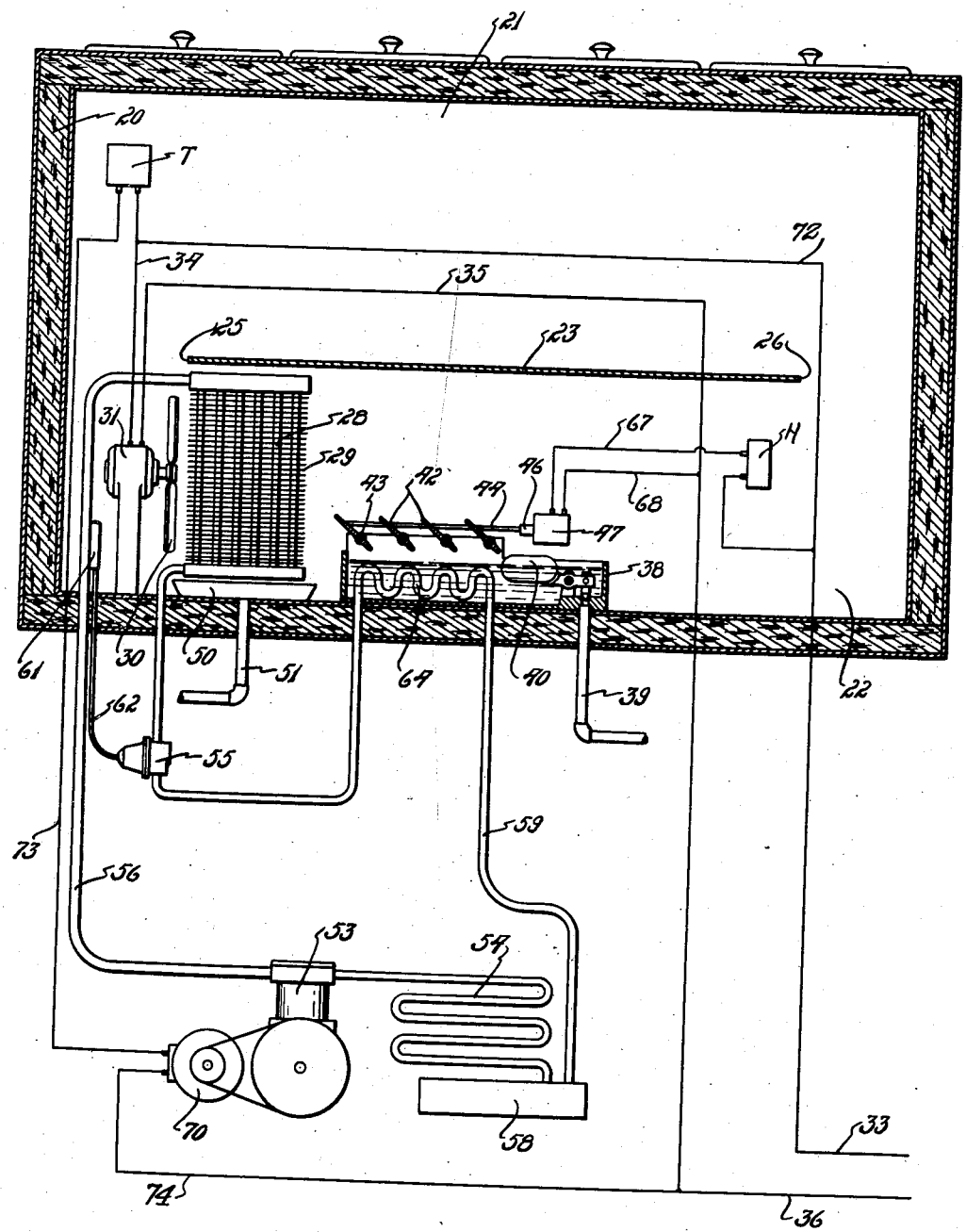
INVENTOR.
LAWRENCE A. PHILIPP
BY
ATTORNEY.

Patented Oct. 11, 1938

2,133,039

UNITED STATES PATENT OFFICE 2,133,039

AIR CONDITIONING SYSTEM

Lawrence A. Philipp, Detroit, Mich., assignor, by mesne assignments, to Nash-Kelvinator Corporation, Detroit, Mich., a corporation of Maryland Application September 1, 1934, Serial No. 742,418

7 Claims. (Cl. 62—6)

The present invention relates to refrigerating and air conditioning systems and particularly to systems in which the air is refrigerated and the humidity thereof is controlled.

In refrigerating systems for cooling meats and the like, too much moisture at times is withdrawn from the article being refrigerated by the heat absorbing element and one of the objects of the present invention is to cause the circulating air to circulate in moisture absorbing relation with water immediately after it is cooled by the heat absorbent. In carrying out this object it is a further object of the invention to regulate the amount of moisture absorbed by the air from the water in accordance with the relative humidity of the air being conditioned and refrigerated.

A preferred form of refrigerating system comprises a mechanical refrigerator including an evaporator and a compressor-condenser unit. In such type of systems the high pressure refrigerant is at a relatively high temperature and one of the objects of the present invention is to transfer this heat to the water, which is used for increasing the relative humidity of the air in the cabinet. In this manner, not only is the temperature of this high pressure refrigerant reduced to increase the efficiency of the refrigerating system, but also, the heat transferred to the water is utilized in assisting in vaporizing the water.

Other and further objects and advantages will be apparent from the following description, reference being had to the accompanying drawing wherein a preferred form of embodiment of the present invention is clearly shown.

The figure in the drawing illustrates diagrammatically my improved refrigerating and air conditioning system.

Referring to the drawing, there is shown a butcher's box or display case 20 which is divided into an upper compartment 21 and a lower compartment 22 by a partition wall 23. The partition wall 23 stops short of the opposite ends of the cabinet to provide air passages 25 and 26. A heat absorber 28, having fins 29 thereon for increasing the heat absorbing surface thereof, is disposed within the compartment 22. A fan 30 driven by a motor 31 causes air to be withdrawn from compartment 21 through the passage 25 into the compartment 22 where it passes over the heat absorber 28 and is expelled into compartment 21 through passage 26. The motor is preferably continuously operated, it being connected to service mains by wires 33, 34, 35 and 36.

Air circulating over the heat absorber 28 is reduced to below its dew point causing precipitation of moisture and, under certain conditions this precipitation is in excess of that desired causing the air to become too dry. Dry air is detrimental to the proper preservation of certain types of foods, for example cut meats. In accordance with the present invention I add moisture to the air if the relative humidity thereof is too low. This is accomplished by causing some of the air, which has been cooled, to circulate in moisture absorbing relation with water whereby the air assimilates moisture. To accomplish this I provide a tank or a pan 38 which is connected with a water main 39 and I maintain a constant level therein by a float 40. Air after it passes over the heat absorber 28, flows over the surface of the water in the pan 38 and absorbs moisture therefrom. In order to regulate the quantity of air flowing over the water and thereby control the amount of water absorbed, there is provided a series of baffles 42 which are pivotally mounted at 43. These baffles 42 are connected with an actuating rod 44 which rod in turn is connected with a solenoid plunger 46. The solenoid plunger is actuated by a solenoid coil 47 and the coil is caused to be energized and de-energized by a humidostat H. When the relative humidity of the air is low, the humidostat H causes the coil 47 to be energized and causes the baffles or damper 42 to be moved to the position shown in the drawing whereby the baffles will cause part of the air to be deflected downwardly and over the surface of the water in tank 38. When the relative humidity of the air is at that desired, the humidostat causes de-energization of coil 47 whereby the baffles 42 are swung counter-clockwise by gravity and thereby do not deflect the air over the water. The circuit of the humidostat and coil 47 includes wires 33 and 36, humidostat H, wire 67, coil 47 and wires 68, 35 and 36.

Preferably the heat absorber 28 is maintained at a temperature at which precipitation takes place so as to prevent the relative humidity of air from becoming too high and the moisture condensed at the evaporator 28 will drain into a pan 50 and will be conducted out of the cabinet or through a drain pipe 51. Thus it is apparent that the evaporator prevents the air from rising too high in relative humidity and the humidostat prevents the relative humidity from being decreased too low.

Any suitable heat dissipator may be provided for removing the heat from the heat absorber 28 and in the present illustration the refrigerating system is of the compressor-condenser-expander type including in addition to the heat absorber 28, herein shown as an evaporator, a compressor 53, a condenser 54 and an expansion valve 55. When the compressor is in operation, it withdraws gaseous refrigerant from the top of the evaporator 28 through a pipe 56 which is connected to the low pressure side of the evaporator. The refrigerant compressed by the compressor 53 is conducted into the condenser 54 where it is liquefied and conveyed to a receiver 58. The relatively warm liquid refrigerant is conducted by a pipe 59 to the expansion valve 55. The expansion valve may be of any suitable type and is herein shown as what is known in the art as a thermostatically controlled expansion valve, and a specific form of such valve is shown in the Marshall Patent #630,617, and is employed as shown in the Marshall Patent 1,003,283. For the purpose of subjecting the expansion valve to the temperature at the outlet of the evaporator, a bulb 61 containing a volatile fluid is intimately connected to the suction pipe 56 and is connected internally with a pipe 62 to the back side of the flexible wall of the valve 55. The bulb 61 and pipe 62 containing a volatile fluid, affects the operation of the valve 55 so that said valve will operate also in accordance with changes in temperature at the outlet of the evaporator and the adjustment is such that it will cause the valve 55 to close in the event that refrigerant is vaporizing in the suction line 56. In actual practice the expansion valve 55 is placed within the refrigerator cabinet and is shown outside of the cabinet in this illustration merely for the purpose of simplicity.

The high pressure liquid line 59 includes a coil 64 which is disposed within the water tank 38 and therefore in heat exchange relation with the water in the tank for the dual purpose of removing heat from the relatively warm liquid refrigerant to increase the efficiency of the compressor and also for the purpose of assisting in vaporizing the water within the tank 38.

In the preferred form of the invention, the compressor is operated intermittently to control the temperature of the air. The reciprocating compressor 53 is driven by a motor 70 which is started and stopped in accordance to the demand for refrigeration. A thermostat T controls the motor 70 and is connected in the electrical system as follows: wires 33 and 72, thermostat T, wire 73, motor 70 and wires 74 and 36.

While the form of embodiment of the present invention as herein disclosed constitutes a preferred form, it is to be understood that other forms might be adopted, all coming within the scope of the claims which follow:

I claim as my invention:

1. A refrigerating and air conditioning system comprising in combination a cabinet, heat absorbing element within the cabinet, a source of moisture within the cabinet, means for heating said source of moisture, means for causing air to circulate first over the heat absorbing element and then over the source of moisture for cooling the air and then absorbing some of the moisture, and means responsive to humidity condition of the air for regulating the flow of a portion of the air over the source of moisture.

2. A refrigerating and air conditioning system comprising in combination an evaporator, means for withdrawing gaseous refrigerant from the evaporator and for condensing the gaseous refrigerant and for conducting the condensed refrigerant to the evaporator, a refrigerating cabinet enclosing said evaporator, means within the cabinet for causing air to circulate over the evaporator, a water pan within the cabinet, said circulating means including a relatively high temperature pipe in heat exchange relation with the water in said pan, means responsive to humidity condition of the air in the cabinet for causing a portion of the cooled air to circulate in water absorbing relation with the water in said pan.

3. In a refrigerating and air conditioning system comprising in combination, a cabinet, a heat absorbing element within the cabinet, a source of moisture within the cabinet, heat exchanging means in heat exchanging relationship to the source of moisture, for increasing the rate of evaporation thereof, means for causing air to circulate progressively, first over the heat absorbing element and then over the source of moisture for progressively cooling and humidifying the air, and means responsive to humidity conditions of the air within the cabinet for regulating the flow of the cooled air over the source of moisture.

4. In a refrigerating and air conditioning system comprising in combination, a cabinet, a heat absorbing element within the cabinet, a source of moisture within the cabinet, heat exchanging means in heat exchanging relationship to the source of moisture for increasing the rate of evaporation thereof, means for causing air to circulate progressively, first over the heat absorbing element and then over the source of moisture for progressively cooling and humidifying the air, means responsive to humidity conditions of the air within the cabinet for regulating the flow of the cooled air over the source of moisture, and thermal responsive means within the cabinet for regulating the temperature within said cabinet.

5. A refrigerating and air conditioning system comprising in combination, a cabinet, a heat absorbing element within the cabinet, a source of moisture within the cabinet, means for heating said source, means for causing progressive movement of the air to first pass over the heat absorbing element and then over the source of moisture for progressively cooling and humidifying the air, and means for regulating the degree of humidification of the air.

6. An air conditioning system comprising, in combination, a cabinet, a heat absorbing element, a liquid containing receptacle, means for maintaining liquid in said receptacle, means for heating said liquid means for causing progressive movement of the air to first pass over the heat absorbing element and then pass such air over said liquid for progressively cooling and humidifying the air, and means for regulating the degree of humidification of the air.

7. The method of conditioning air which comprises circulating air through a cooling zone for reducing the temperature of the air, contacting a portion of said cooled air with a body of artificially heated liquid and controlling the amount of such cooled air which contacts with said liquid in accordance with changes in humidity conditions of the air.

LAWRENCE A. PHILIPP.